Feb. 24, 1970    R. E. AYRES    3,496,597
CONTAINER FORMING APPARATUS
Filed Aug. 24, 1966    2 Sheets-Sheet 1

INVENTOR.
Ralph E. Ayres
BY
ATTORNEY

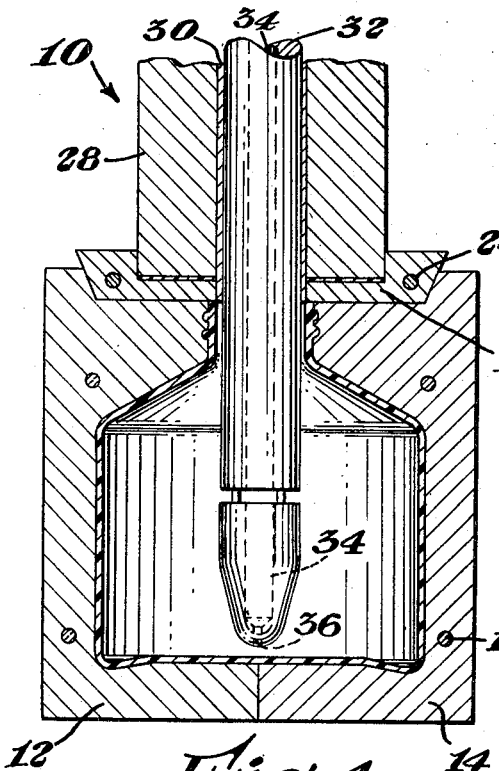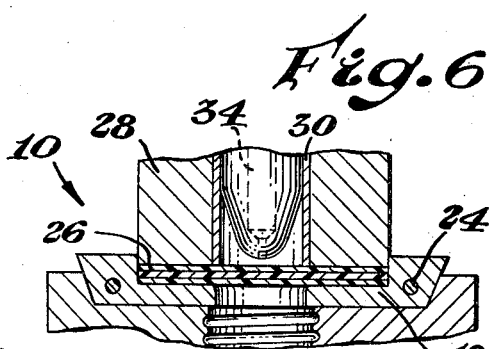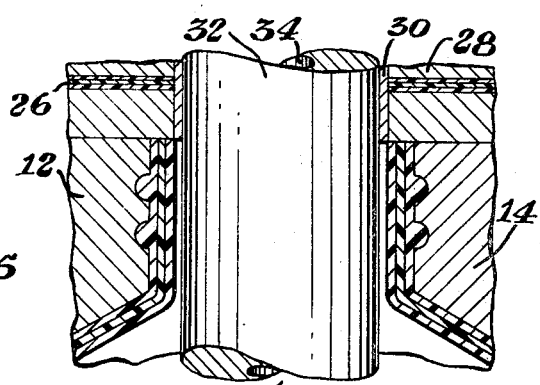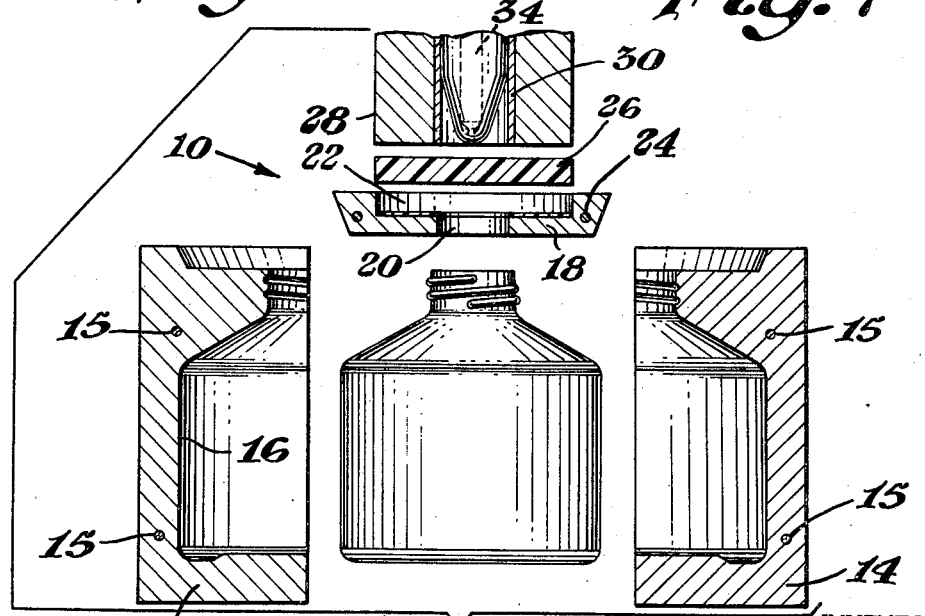

United States Patent Office 3,496,597
Patented Feb. 24, 1970

3,496,597
CONTAINER FORMING APPARATUS
Ralph E. Ayres, Midland, Mich., assingor to The Dow Chemical Company, Midland, Mich.. a corporation of Delaware
Filed Aug. 24, 1966, Ser. No. 574,757
Int. Cl. B29c 5/06
U.S. Cl. 18—5                    8 Claims

ABSTRACT OF THE DISCLOSURE

Apparatus for extrusion forming a preform into a tubular closed end extrusion which is trim-free. In the extrusion process a plug pushes a heated preform through a relatively small aperture in the middle of a die plate, the plug causing the preform to flow from the outside towards the middle of the die plate to form the extrusion through the aperture. The trim-free closed end tubular extrusion can be employed as a parison for a blow molded container having a narrow neck.

---

This invention relates generally to the making of blow molded containers and other articles and, more particularly, to apparatus for substantially scraplessly forming of blow molded articles without the requirement of an in-line extruder or injection molding apparatus.

The usual prior arrangements for achieving a blow molded container generally require the use of a plastic extruder such as that shown in U.S. Patent No. 3,120,679, for example, or a direct-in-line plastic injection molding apparatus, as typified by U.S. Patent No. 3,170,970. Such arrangements require the blow molding fabricator to have relatively expensive extruding or injection molding apparatus on the premises and often involved considerable scrap and trim in their use. A prior arrangement which has tried to get around the need for such direct-in-line apparatus is sometimes known as the "cold tube process." Here a continuous length of pipe is cut to appropriate lengths, which lengths are later reheated, clamped in a mold and blow molded much as in extrusion blow molding. However, this process has not been completely satisfactory because the preformed parison must be made to especially close tolerances and substantial scrap is generated.

The present invention has accomplished the desirable result of using substantially all of the resin put into the apparatus for production of blow molded articles and produces trim-free articles, all without requiring a direct-in-line extruder or injection molding apparatus.

Briefly, the present invention comprises the placing into a die of a relatively simple-shaped preform of a quantity of the polymeric resin which is needed for a given blow mold cycle. The preform is heated, compressed, extruded and guided into the shape of a parison. The parison can then be blown into the desired configuration as defined by the cavity or cavities of the blow mold. As more articles are desired, additional preforms are put into the die and a like procedure is followed for each subsequent mod cycle. By various techniques, the present invention can be employed to supply articles formed of one resin material, multi-layered different resins, layered combinations of resinous and nonresinous materials, impregnated or filled resinous materials, and the like.

Yet additional objects and advantages of the present invention are even more apparent when taken in conjunction with the accompanying drawing in which like characters of reference designate corresponding material and parts throughout the several views thereof, in which:

FIGURE 4 is a view like FIGURE 1 only with the parison being blown to the shape of a blow mold cavity to provide a desired scrapless article;

FIGURE 5 is a view like FIGURE 1, only exploded, after the article is fully formed and released from the blow mold, and just as another disc is being inserted in the apparatus for the making of the next article;

FIGURE 6 is a view like FIGURE 1 only further fragmented and employing a multi-layered preformed disc; and FIGURE 7 is an enlarged fragmentary view showing an article formed in the blow mold from a multi-layered disc.

Figure 1:
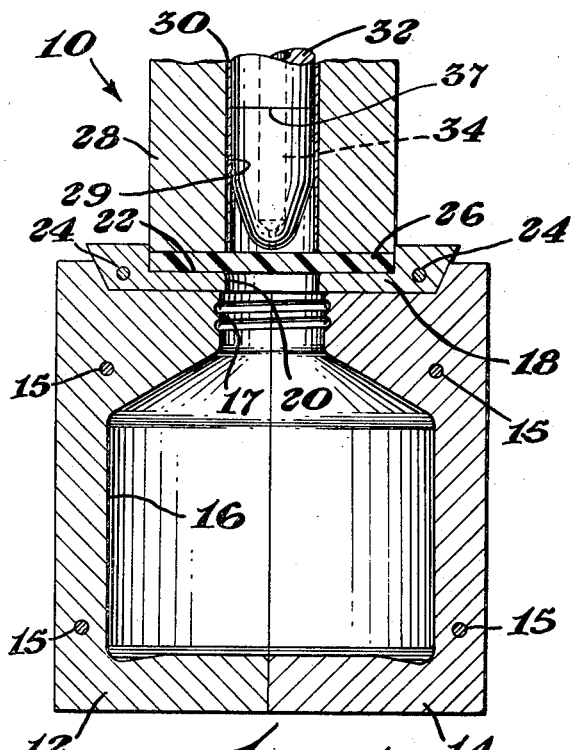
FIGURE 1 is a fragmentary, schematic vertical sectional view of a preferred embodiment of the apparatus of this invention with a preformed disc located therein but prior to any forming thereof.

Referring to the drawings in more detail, an apparatus 10 includes blow mold die halves 12 and 14 each including part of a mold cavity 16, the cavity 16 defining the configuration of a container eventually to be formed. In this particular embodiment the container is a bottle, the neck portion 17 thereof being at the top of the mold halves 12 and 14. Cooling fluid passageways 15 are usually provided in the mold halves to minimize the period of time necessary for the material comprising the bottle to set once blown against cavity 16.

Set within the top portion of the mold halves 12 and 14 is a die insert plate 18. Plate 18, as shown, has a circular aperture 20 located in the center thereof and a circular recess 22 in the upper part thereof and concentric with the aperture 20. Heating of the die 18 can be accomplished by passing hot fluid through the hole 24 extending thereabout.

Shown positioned in recess 22 is a disc 26 which is a molded preform containing substantially enough resin, such as natural bottle grade polyethylene, or other material to completely form the bottle, as defined by the mold cavity 16 of the mold halves 12 and 14. The recess 22 is of a dimension adequate to receive the disc 26.

Engaged with the top of the disc 26 is a hollow piston 28 adapted to fit closely within the recess 22 of the die 18. Hollow 29 of the piston is concentric with the hole 20. Axial movement (upwardly and downwardly) of the piston 28 can be achieved by any well-known mechanism (not shown).

In the hollow 29 of the piston 28 is a cut-off sleeve 30 which also is adapted to be movable axially by a well-known mechanism (not shown) but, preferably, independently of the movement of the piston 28. The outer diameter of sleeve 30 is only slightly smaller than the diameters of hole 20 and hollow 29, but sufficient to permit ready movement of the sleeve 30 with respect thereto.

Internally of the sleeve 30 is a mandrel 32 also capable of axial movement within the sleeve 30, and preferably independently thereof, and of the piston 28 (again by a well-known mechanism not shown). The mandrel 32 includes an axial hole 34 converging to an opening 36 at the bottom of mandrel 32, such hole 34 being connected to a source of air pressure, not shown. Mandrel 32 is laterally split at 37 such that when it comes time to blow, it separates via axially movable pins 39 to present a passageway 41 in open communication with hole 34 to distribute better the blowing air. Of course, other passageway systems for distributing the air might be employed instead, but it has been found that the above arrangement works especially well in the type of blowing involved in the present invention. When the mandrel 32 is in its extended position there is a gap 38 between it and the aperture 20, for reasons which will be explained hereinafter.

Figure 2:
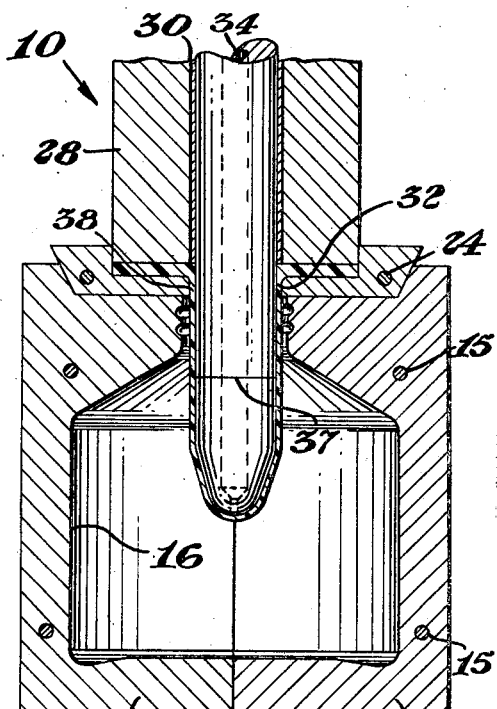
FIGURE 2 is a view similar to FIGURE 1 illustrating the disc in a partially formed configuration.

In the operation of apparatus 10, disc 26 is heated to a temperature whereby it can be formed into an article, which temperature in each instance will be dependent upon the particular type of material (discussed later) employed in forming the desired article. The disc 26 can be preheated before entering the recess 22, the heat from plate 18 permitting the temperature to be maintained if needed, or it can be heated by the plate 18 itself, depending on the material and speed desired. In FIGURE 2 the piston 28 and sleeve 30 have moved partially downwardly through the aperture 20 thereby driving the heated material of disc 26 toward the center of the mold halves 12 and 14. Simultaneously, the mandrel 32 moves downwardly into the recess and through aperture 20 causing extrusion of the material thereof through gap 38 formed between mandrel 32 and aperture 20. The mandrel 32 is encased in the extruding material of the disc 26 and guides it downwardly into a parison shape.

Figure 3:
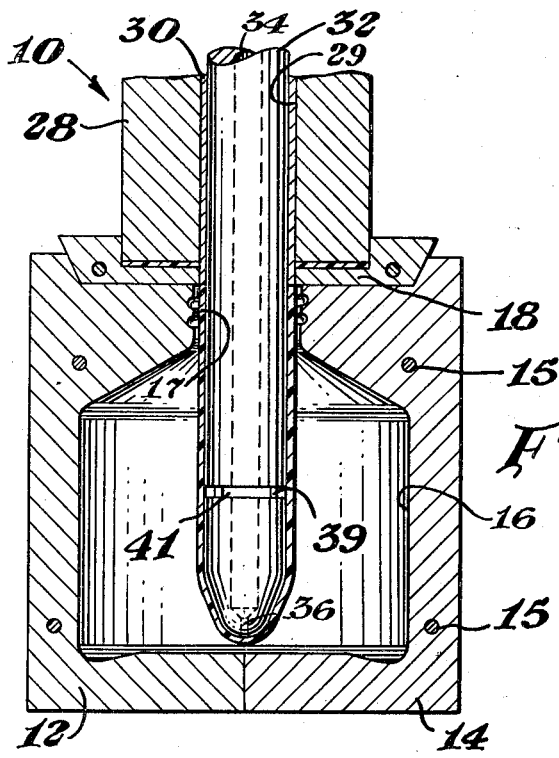
FIGURE 3 is a view like FIGURE 1 illustrating the disc formed into a full parison.

This simultaneous movement of piston 28, sleeve 30 and mandrel 32 continues until a closed-end tubular extrusion or parison 40 is in a fully extended position as shown in FIGURE 3. The wall thickness of the parison is determined by the annular gap 38 between the plate 18 and mandrel 32 and by the relative speeds of the piston 28 and sleeve 30 with respect to mandrel 32. The parison 40 can thus be programmed along its length by varying the relative speeds of the piston 28, sleeve 30 and mandrel 32 to give a controlled (uniform or otherwise) wall thickness in the blown bottle. After piston 28 stops, the sleeve 30 moves axially downwardly therefrom severing the parison 40 from the remaining stock of the disc 26 by the shearing action of the outside edge of the sleeve 30 against the inner periphery of the recess 22. However, it is also considered satisfactory if the sleeve 30 is held in its position axially in alignment with mandrel 32 until a later time, e.g., after blowing before it descends to sever the parison 40.

In any event, after the parison is fully extended, blow air is then emitted through hole 34 to form the parison against the cavity wall 16. The resulting container is formed without scrap at its neck because the sleeve 30 extends down to the top of the neck portion 17 of the cavity 16 providing a finished top, and at its bottom because no pinch is necessary since the parison is formed as a closed end tube. A container requiring no supplemental trim operations is thus produced. The container can be ejected when the mold halves 12 and 14 open, as illustrated by FIGURE 5, by a blast of additional air through mandrel hole 34.

The next container can be made by placing a second disc 26 in the recess 22 and performing the same steps as heretofore outlined above for the manufacture of the first container, as is just about to occur in FIGURE 5. The small quantity of material remaining in the recess 22 from the first disc 26 is substantially merged with and pushed outwardly by the material of the second disc 26 as it is acted upon by piston 28. The heat from such second disc can aid in the merger and extrusion of such remaining material. Thus as each successive disc 26 substantially pushes the remainder of the preceding disc out into the next parison, no material waste from the process results except possibly from the last disc processed in a given run (which too might be later reheated and used). While it is conceivable that not all of the material of a preceding disc is pushed out by the immediately succeeding disc, any slight remainder is undoubtedly reduced even further by other subsequent discs as they are extruded. In any event, the amount extruded in each blow mold cycle is just sufficient for that cycle, the operation being considered scrapless since each disc thus represents a cycle and no subsequent trim operations are required.

To take full advantage of the above-described process the preforms should be of a fairly simple shape. One of the simplest shapes and one which fits the process well is a flat relatively thin circular disc, as described above. These can be easily made by a number of processes including cutting from extruded sheet, injection molding, compression molding from granules or powder, and casting. One such preform actually employed comprised a polyethylene resin in the form of a circular flat disc about three inches in diameter and about one-quarter inch thick. It resulted in a parison having a length of about five inches and a diameter of about one inch. Shapes other than circular might also be used, such as square, rectangular, or hexagonal. These other shapes would give an advantage in reduced scrap when they are cut from a flat sheet. The preforms can also be contoured in thickness, e.g., conical, to aid in distribution of material in the parison if such is desired or necessary.

Layered containers could also be formed by starting with multi-layered preforms cut from multi-layered extruded sheet, such as taught in French Patent 1,424,703. The preforms might also be made by cutting thinner blanks from the various materials desired in the container, and bonding these together in the desired layered structure either by the natural compatibility of the materials themselves or by an adhesive between the layers. However, even if no bonding occurs, this would not appear to be especially disadvantageous in the present process since there is no pinch off or sprue at the bottom of the container which would invite leakage. To this extent, even nonbonded layers can be employed together to form a desired article.

An excellent multi-layered container could be a polyethylene/saran composite to provide high vapor and gas barrier qualities. Other well-known resins might be used to achieve other obviously desirable barrier or nonreactant properties. Likewise different plastics with impact and modulus characteristics could be used to custom-make a bottle with the desired combination of impact strength and rigidity as, for example, a low impact strength/high rigidity polystyrene together with a high impact strength/ low rigidity polyethylene. Likewise, a nonfood approved outer layer resin might be used with a food approved inner layer resin for a given container. A low melting metal or metal alloy that is extremely ductile or near its liquid state at plastic forming temperatures might also be used in combination with certain thermoplastic materials to achieve desirable results for certain applications.

Other possible container properties might also be achieved by using a metalized plastic in the preform to provide a decorative bottle or to improve the barrier properties thereof. Also various decorative or information bearing layers could be included in the preform as could layers of different colors or transparency. If the preform comprised many especially thin layers of plastics with different indices of refraction, bottles could present a silvery or iridescent appearance. Likewise strands of materials such as glass fibers could be included in the preform to improve the toughness of the resulting containers. These and other modifications of the preform to achieve a desired result are all within the contemplation of the present invention.

If an orientable plastic material is used and the piston is rotated about it longitudinal axis while the parison is being formed, a bottle possessing multi-axial orientation can be formed. The squeezing of the plastic by the piston induces shear and orientation in the flow direction while rotation provides orientation in the hoop or circumferential direction. Orientation can also be achieved by rotating the mandrel about its longitudinal axis while the parison is being formed.

While certain representative embodiments and details have been shown for the purpose of illustrating the invention it will be apparent to those skilled in the art

What is claimed is:

1. A molding apparatus comprising a hollow piston, a sleeve in said piston, a mandrel in said sleeve, means for moving each of said piston and sleeve and mandrel axially of one another, a die plate having a recess and an aperture, said recess directed towards said piston, said aperture being located substantially in the center of said recess and having an internal diameter slightly larger than the external diameter of said sleeve and being in alignment therewith, said recess being of a diameter just sufficient to receive a preform of forming material and said piston, said means being adapted to move said piston and mandrel simultaneously towards the bottom of said recess and spacedly through said aperture, respectively, and to move said sleeve with said mandrel and, after said mandrel stops, therebeyond to the bottom of said aperture whereby a trim-free closed end tubular extrusion can be formed.

2. The appartus of claim 1 wherein there are blow mold halves juxtaposioned with the bottom of said die plate and operable to open and close upon said mandrel, and means for emitting a pressurized fluid through said mandrel to expand said extrusion against the cavity of said blow mold halves.

3. The apparatus of claim 1 wherein said piston is rotatable about its vertical axis.

4. The apparatus of claim 1 wherein said means for moving the piston and mandrel and sleeve is capable of moving each independtly of the other.

5. The apparatus of claim 1 wherein said mandrel is rotatable about its vertical axis.

6. The apparatus of claim 2 wherein said means for emitting a pressurized fluid comprises a passageway extending at least partially along the axial length of said mandrel, the lowermost end of said mandrel being axially separable from the rest thereof when the mandrel is fully extended to provide a lateral air passageway in communication with said first mentioned pasageway.

7. A molding apparatus comprising a hollow piston, a mandrel located interiorly of said piston, means for moving each of said piston and mandrel axially of one another, cutoff means contiguous with said mandrel and moveable axially therewith or separately therefrom, a die plate having a recess and an aperture, said recess directed towards said piston, said aperture being located substantially in the center of said recess and having an internal diameter slightly larger than the external diameter of said cutoff means and being in alignment therewith, said recess being of a diameter just sufficient to receive a preform of forming material and said piston, said axial moving means being adapted to move said piston and mandrel simultaneously towards the bottom of said recess and said mandrel spacedly through said aperture, respectively, to effect extrusion of said preformed and to move said cutoff means to the bottom of said aperture to separate the extrusion from said preform, whereby a trim-free closed end tubular extrusion can be formed.

8. A molding apparatus comprising a hollow piston, a mandrel located interiorly of said piston, means for moving each of said piston and mandrel axially of one another, a die plate having a recess and an aperture, said recess directed towards said piston, said aperture being located substatnially in the center of said recess and having an internal diameter slightly larger than the external diameter of said mandrel and being in alignment therewith, said recess being of a diameter just sufficient to receive a preform of forming material and said piston, said axial moving means being adapted to move said piston and mandrel simultaneously towards the bottom of said recess and said mandrel spacedly through said aperture, respectively, to effect extrusion of said preform, whereby a closed end tubular extrusion can be formed.

References Cited

UNITED STATES PATENTS

| 3,203,218 | 8/1965 | Bolt et al. |
| 3,009,196 | 11/1961 | Hagen. |
| 3,305,158 | 2/1967 | Whiteford. |
| 3,224,038 | 12/1965 | Budesheim. |
| 3,324,509 | 6/1967 | Hey et al. |
| 3,341,644 | 9/1967 | Allen. |

FOREIGN PATENTS 642,609  5/1964  Belgium.

WILBUR L. McBAY, Primary Examiner

U.S. Cl. X.R.

18—19